United States Patent
Kim et al.

(10) Patent No.: US 11,002,755 B2
(45) Date of Patent: May 11, 2021

(54) METHOD FOR INDICATING IMPACT OF EXTERNAL SHOCKS AND ELECTRONIC DEVICE THEREOF

(71) Applicant: Samsung Electronics Co., Ltd., Suwon-si (KR)

(72) Inventors: Taekeun Kim, Suwon-si (KR); Kihoon Kang, Suwon-si (KR); Shinyoung Na, Suwon-si (KR); Kihun Eom, Suwon-si (KR); Jeongmin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/663,866

(22) Filed: Oct. 25, 2019

(65) Prior Publication Data

US 2020/0132712 A1 Apr. 30, 2020

(30) Foreign Application Priority Data

Oct. 26, 2018 (KR) .................. 10-2018-0129328

(51) Int. Cl.
| | | |
|---|---|---|
| *G01P 15/08* | (2006.01) | |
| *G06F 3/14* | (2006.01) | |
| *G06F 3/041* | (2006.01) | |

(52) U.S. Cl.
CPC ............ *G01P 15/0891* (2013.01); *G06F 3/14* (2013.01); *G06F 3/041* (2013.01)

(58) Field of Classification Search
CPC ...... G01P 15/0891; G01P 15/08; G01P 15/18; G06F 3/14; G06F 11/273; G06F 11/3013; G06F 11/3072
See application file for complete search history.

(56) References Cited

U.S. PATENT DOCUMENTS

| | | | | |
|---|---|---|---|---|
| 5,928,300 A | * | 7/1999 | Rogers | B60R 21/0132 180/268 |
| 6,453,266 B1 | * | 9/2002 | Chainer | G06F 1/1613 340/506 |
| 7,541,939 B2 | | 6/2009 | Zadesky et al. | |
| 2008/0224879 A1 | * | 9/2008 | Zadesky | G01P 15/06 340/653 |
| 2009/0309745 A1 | * | 12/2009 | Johnson | G06F 11/3013 340/635 |

(Continued)

FOREIGN PATENT DOCUMENTS

| | | |
|---|---|---|
| JP | 2003-114180 A | 4/2003 |
| JP | 2014-232027 A | 12/2014 |

(Continued)

OTHER PUBLICATIONS

International Search Report and Written Opinion Report dated Feb. 13, 2020, issued in International Application No. PCT/KR2019/014200.

*Primary Examiner* — Helen C Kwok

(74) *Attorney, Agent, or Firm* — Jefferson IP Law, LLP

(57) ABSTRACT

A method for indicating impact of external shocks on an electronic device and the electronic device thereof are provided. An operating method of the electronic device includes monitoring shock related information due to an external force, calculating a shock amount and a shock position based on the shock related information, and calculating a shock state of a component in the electronic device based on the shock amount and the shock position.

24 Claims, 16 Drawing Sheets

(56) References Cited

U.S. PATENT DOCUMENTS

| | | | |
|---|---|---|---|
| 2011/0053641 A1* | 3/2011 | Lee | G06F 3/04883 |
| | | | 455/556.1 |
| 2012/0079870 A1* | 4/2012 | Ramirez | G01P 15/0891 |
| | | | 73/12.04 |
| 2012/0324980 A1* | 12/2012 | Nguyen | G11B 19/042 |
| | | | 73/12.06 |
| 2013/0068017 A1* | 3/2013 | Perkins | G01C 19/5783 |
| | | | 73/504.02 |
| 2013/0090881 A1* | 4/2013 | Janardhanan | G06F 1/163 |
| | | | 702/104 |
| 2013/0124138 A1* | 5/2013 | Baek | B60R 16/0234 |
| | | | 702/141 |
| 2014/0285333 A1* | 9/2014 | Imamura | G01P 15/0891 |
| | | | 340/436 |
| 2015/0054622 A1* | 2/2015 | Jun | G06K 7/10356 |
| | | | 340/10.1 |
| 2016/0003863 A1* | 1/2016 | Chau | G01P 15/18 |
| | | | 73/152.46 |
| 2016/0223581 A1* | 8/2016 | Parker | G01P 15/18 |
| 2016/0307553 A1* | 10/2016 | Yu | G10H 1/42 |
| 2017/0024300 A1* | 1/2017 | Nomoto | G06F 11/273 |
| 2019/0325188 A1* | 10/2019 | Jo | G06F 21/32 |
| 2020/0158752 A1* | 5/2020 | Eom | G01P 15/08 |

FOREIGN PATENT DOCUMENTS

| | | |
|---|---|---|
| KR | 10-1181815 B1 | 9/2012 |
| KR | 10-1595385 B1 | 2/2016 |
| KR | 10-1603068 B1 | 3/2016 |
| KR | 10-2016-0123935 A | 10/2016 |

* cited by examiner

METHOD FOR INDICATING IMPACT OF EXTERNAL SHOCKS AND ELECTRONIC DEVICE THEREOF

CROSS-REFERENCE TO RELATED APPLICATION(S)

This application is based on and claims priority under 35 U.S.C. § 119 (a) of a Korean patent application number 10-2018-0129328, filed on Oct. 26, 2018, in the Korean Intellectual Property Office, the disclosure of which is incorporated by reference herein in its entirety.

BACKGROUND

1. Field

The disclosure relates to a method for indicating impact of external shocks on an electronic device and the electronic device thereof.

2. Description of Related Art

An electronic device, such as a smartphone, a notebook computer, a tablet computer, or the like, which is carried and used by a person, may be exposed to an external shock at any time. For example, a user may drop the electronic device by mistake or may exert a shock on the electronic device by habit. As such, various shocks may impact a component mounted in the electronic device.

The electronic device may use an accelerometer to recognize the external shock. The accelerometer may measure gravitational acceleration on the electronic device. In general, a 3-axis accelerometer measures a magnitude of gravitational acceleration in three axes X, Y, and Z. However, the accelerometer typically mounted in the electronic device such as a smartphone may measure the acceleration only up to 16 G (1 G=9.8 m/s$^2$).

The above information is presented as background information only to assist with an understanding of the disclosure. No determination has been made, and no assertion is made, as to whether any of the above might be applicable as prior art with regard to the disclosure.

SUMMARY

In general, since acceleration caused by an external shock ranges 1500~3000 G, which is out of a measurement range of an accelerometer mounted on a portable electronic device, the electronic device may not recognize a precise shock amount and monitor impact of the shock.

Aspects of the disclosure are to address at least the above-mentioned problems and/or disadvantages and to provide at least the advantages described below. Accordingly, an aspect of the disclosure is to provide a method and an electronic device, which is shocked by accident or by an artificial force, for effectively recognizing shock information, determining a position of a shock point, determining an impact of the external shock, and indicating the impact.

Additional aspects will be set forth in part in the description which follows and, in part, will be apparent from the description, or may be learned by practice of the presented embodiments.

In accordance with an aspect of the disclosure, an operating method of an electronic device is provided. The operating method includes monitoring shock related information due to an external force, calculating a shock amount and a shock position based on the shock related information, and calculating a shock state of a component in the electronic device based on the shock amount and the shock position.

In accordance with another aspect of the disclosure, an electronic device is provided. The electronic device includes a shock sensor for monitoring shock related information due to an external force, and at least one processor coupled with the shock sensor, wherein the at least one processor may be configured to calculate a shock amount and a shock position based on the shock related information, and calculate a shock state of a component in the electronic device based on the shock amount and the shock position.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A term such as 'portion' or '~er' used hereafter indicates a unit for processing at least one function or operation, and may be implemented using hardware, software, or a combination of hardware and software.

Figure 1:
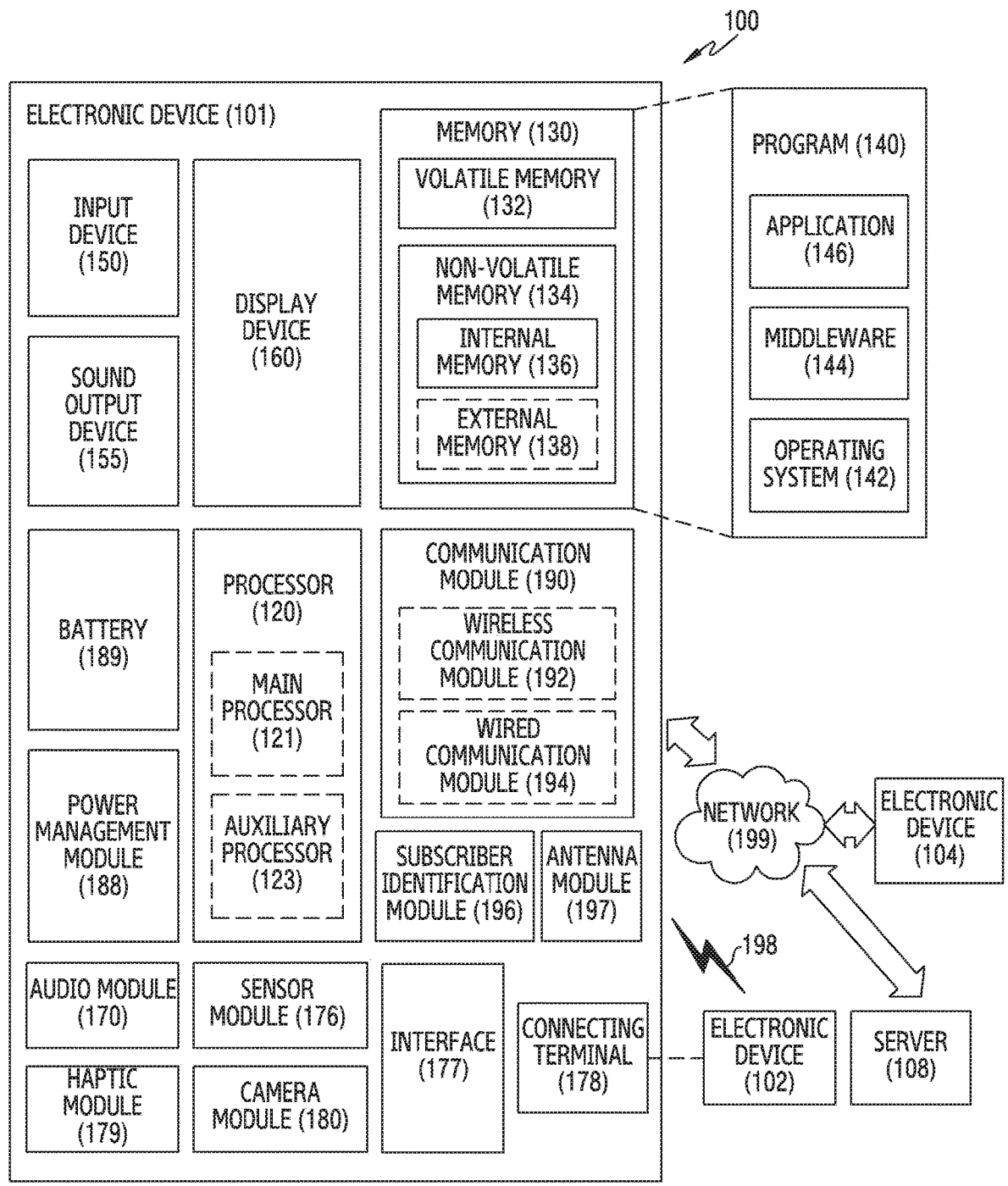
FIG. 1 illustrates a block diagram of an electronic device in a network environment according to an embodiment of the disclosure.

FIG. 1 illustrates a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Various embodiments of the disclosure relate to recognizing shocks on an electronic device using a shock sensor, determining positions of shock points, and determining and displaying an impact of the shocks. For doing so, a sensor module (e.g., the sensor module 176) of the electronic device (e.g., the electronic device 101 of FIG. 1) may include a shock sensor. The shock sensor may be a micro electro mechanical system (MEMS) sensor or an inertial sensor. The shock sensor may include not only an accelerometer or a gyroscope sensor but also a piezo sensor for measuring a force exerted on three axes using pressure. The shock sensor may be referred to as a high-g sensor or a low-g sensor, according to a detected shock level. In general, a measurement range of the low-g sensor may be 8 G or 16 G close to gravitational acceleration 1 G (1 G=9.8 m/s$^2$). The high-g sensor may be an accelerometer for measuring up to a range which is not measured by the low-g sensor, and the shock sensor may be the high-g sensor in the disclosure.

Figure 2:
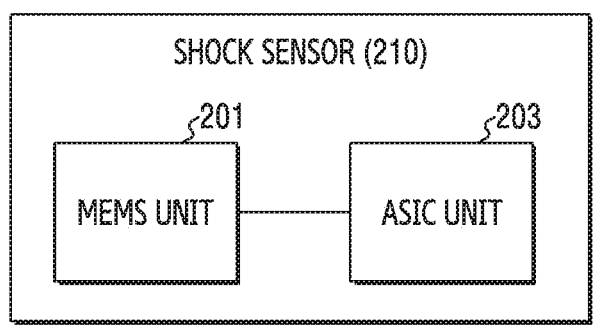
FIG. 2 illustrates a functional configuration of a shock sensor according to an embodiment of the disclosure.

FIG. 2 illustrates a functional configuration of a shock sensor according to an embodiment of the disclosure.

Referring to FIG. 2, a shock sensor 210 may include a MEMS unit 201 and an application specific integrated circuit (ASIC) unit 203.

According to various embodiments, if a MEMS structure inside the sensor changes in shape according to an acceleration received from the sensor, the MEMS unit 201 may output a change of a capacitor value inside the sensor due to the shape change, as an analog signal. The MEMS structure in the MEMS unit 201 is three-dimensional, and may detect and output acceleration information of three dimensions of X, Y, and Z axes.

According to various embodiments, the ASIC unit 203 may process the analog signal outputted from the MEMS unit 201 as a digital signal recognizable by the processor 120 and provide the digital signal to the processor 120. The ASIC unit 203 may modify and process measurement parameters such as acceleration measurement range, sensitivity, and data transfer rate.

Figure 3:
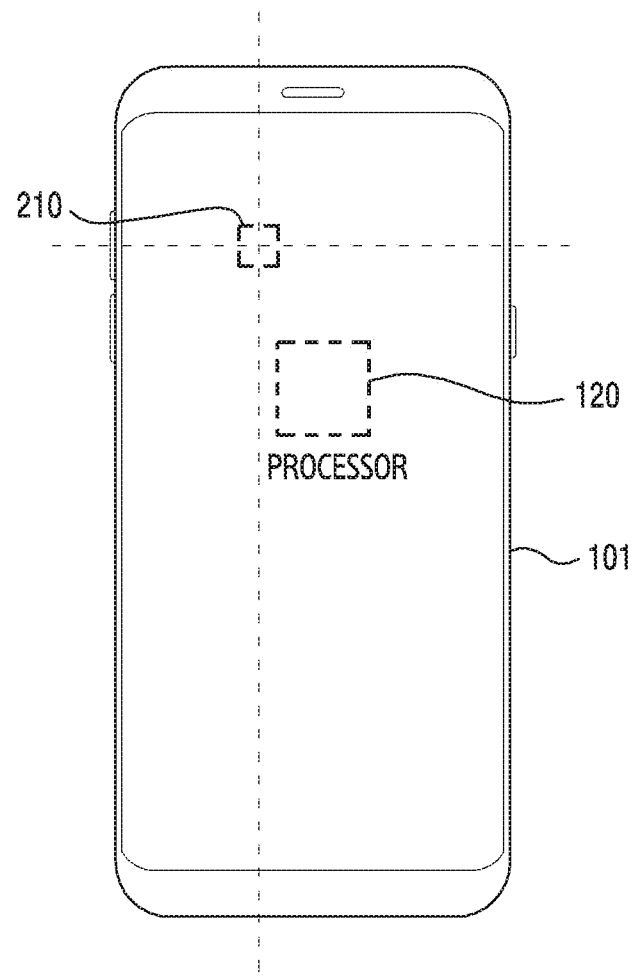
FIG. 3 illustrates disposition of a shock sensor in an electronic device according to an embodiment of the disclosure.

FIG. 3 illustrates disposition of a shock sensor in an electronic device according to an embodiment of the disclosure.

Referring to FIG. 3, the shock sensor 210 may be disposed so that it is not aligned with a center of a housing of the electronic device 101, to effectively acquire shock related data. If the shock sensor 210 is not aligned with the center of the electronic device 101 and is disposed close to an edge of the electronic device 101, recognition accuracy of a shock direction may be higher as compared with the disposition of the shock sensor 210 at the center. If the shock sensor 210 is disposed at the center, shocks may be dispersed to reach the center where the shock sensor 210 is disposed. Hence, the shock amount detected per axis may be relatively less than the disposition close to the edges. The recognition accuracy of the shock direction may be reduced if the shock sensor 210 is disposed at the center as compared to the disposition of the shock sensor 210 toward an edge.

Such results may be identified through a fall test.

Figure 4:
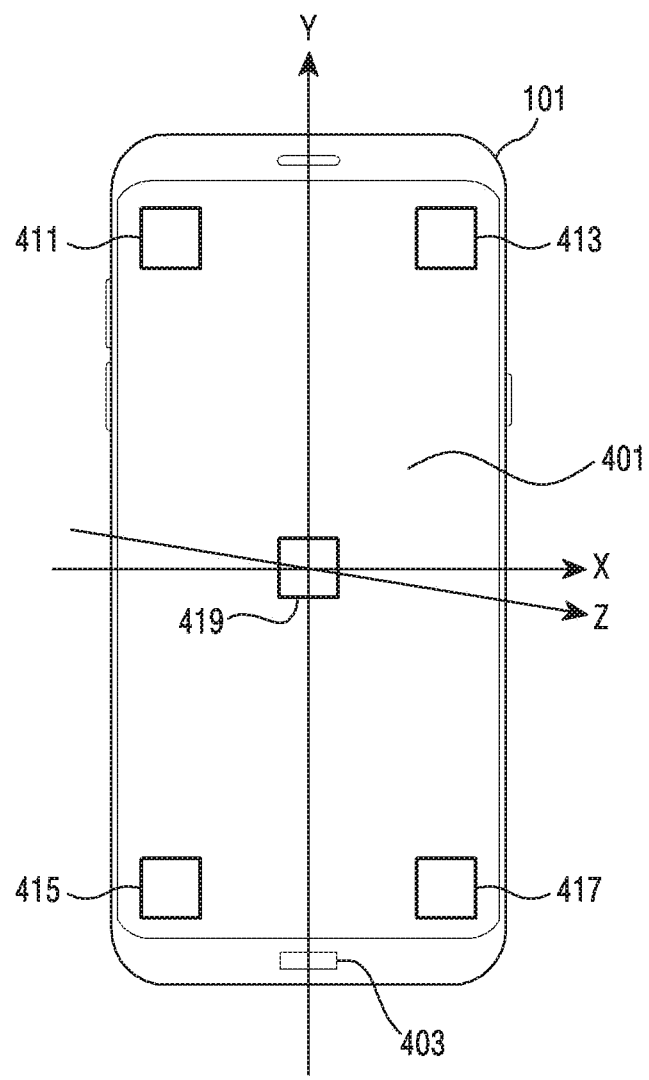
FIG. 4 illustrates directions of X, Y, and Z axes recognized by a shock sensor and disposition of the shock sensor for a fall test in an electronic device according to an embodiment of the disclosure.

FIG. 4 illustrates directions of X, Y, and Z axes recognized by a shock sensor and disposition of the shock sensor for a fall test in an electronic device according to an embodiment of the disclosure.

Referring to FIG. 4, if a display 401 of the electronic device 101 is disposed to face upwards and a home button 403 is disposed towards a bottom of the electronic device 101, the X axis may indicate a horizontal direction, that is, a direction from left to right, the Y axis may indicate a vertical direction, that is, a direction from bottom to top, and the Z axis may indicate a direction out of the display 401. In an embodiment, the shock sensor 210 may output an X value of (+) if the electronic device 101 moves to the right, output a Y value of (+) if the electronic device 101 moves upward, and output a Z value of (+) if the electronic device 101 moves out of the display 401. The above-stated X, Y, and Z axis directions correspond to an embodiment, the axis directions may be determined to different directions, and the number of the axes may be set to various numbers such as six or eight.

According to various embodiments, the shock sensor 210 may be disposed at five positions 411, 413, 415, 417, and 419 of the electronic device 101 for the fall test, wherein the position 419 may correspond to the center of the electronic device 101 and the other four positions 411 through 417 may correspond to four edges not aligned with the center. To identify recognition results of the shock sensor 210, the fall test may be conducted in the (+) X direction, the (+) Y direction, and the (+) Z direction with respect to the five positions.

FIGS. 5A through 5F illustrate output comparison of a shock sensor, which is disposed at an upper left edge and at a center according to various embodiments of the disclosure.

Figure 5A:
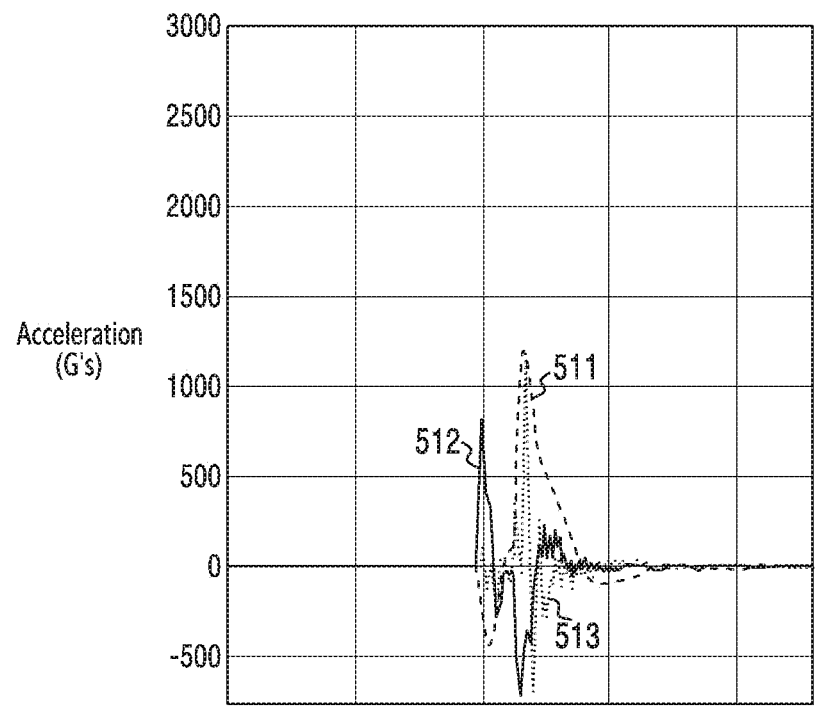
FIGS. 5A, 5B, 5C, 5D, 5E and 5F illustrate output comparison of a shock sensor which, is disposed at an upper left edge and at a center according to various embodiments of the disclosure.
Figure 5B:
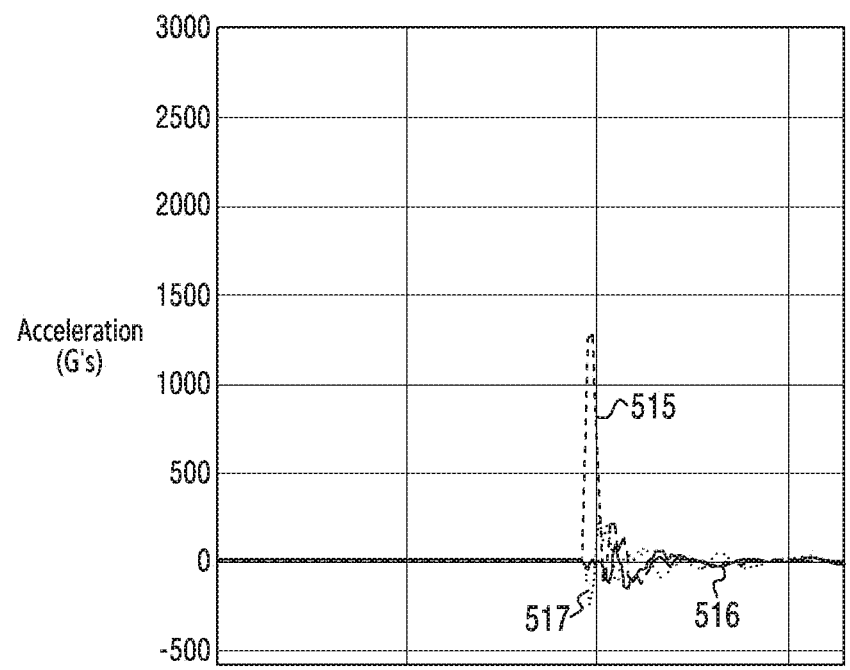
Figure 5C:
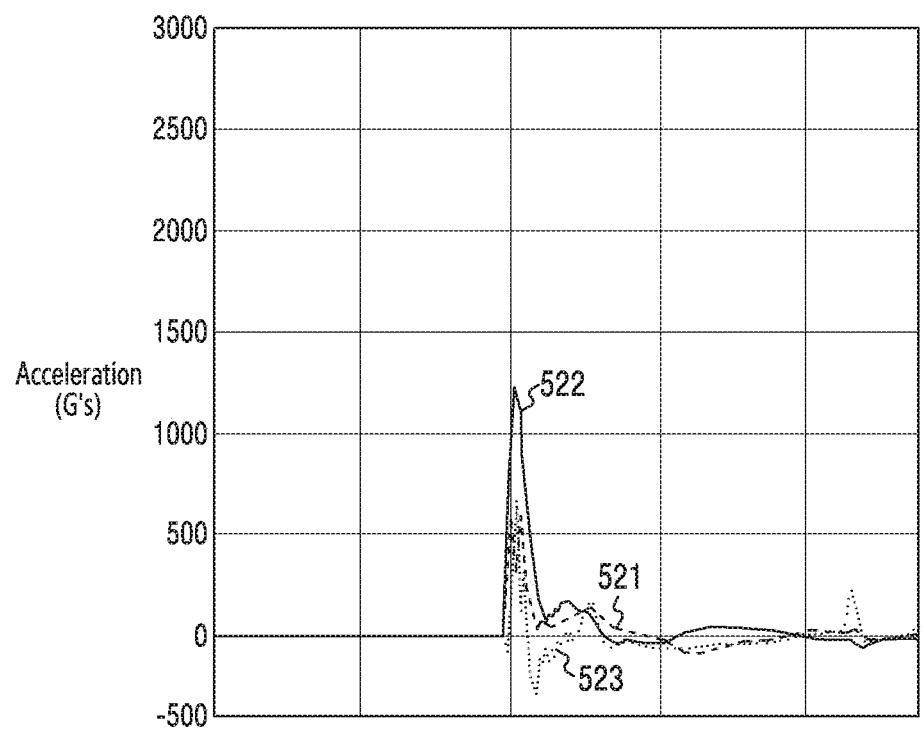
Figure 5D:
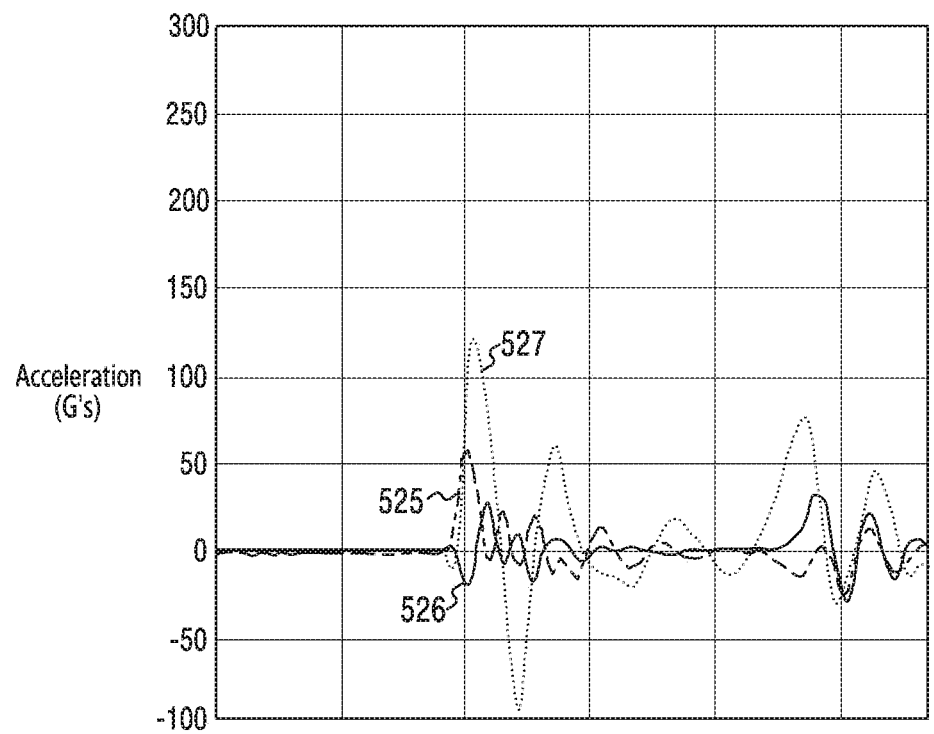
Figure 5E:
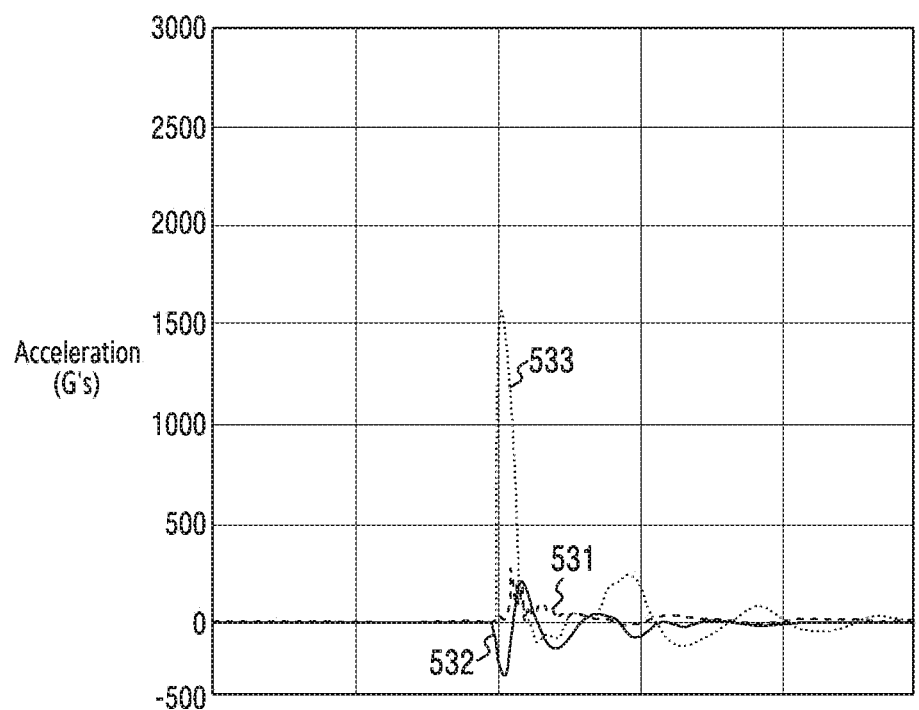
Figure 5F:
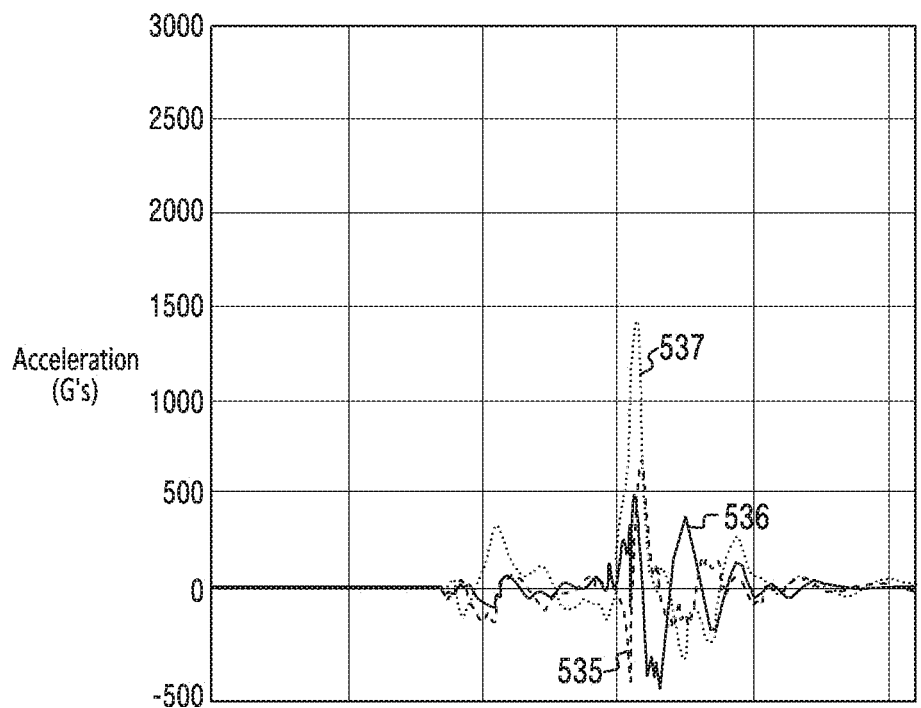

Referring to FIGS. 5A, 5C and 5E, results of the electronic device 101 falling respectively on the X axis, the Y axis, and the Z axis if the shock sensor 210 is disposed at the upper left edge 411 are illustrated, and referring to FIGS. 5B, 5D and 5F, results of the electronic device 101 falling respectively on the X axis, the Y axis, and the Z axis if the shock sensor 210 is disposed at the center 419 are illustrated. For the fall test, the electronic device 101 free-falls 10 cm from the ground in a specific direction using a jig. In FIGS. 5A through 5F, dotted lines 511, 515, 521, 525, 531, and 535 indicate acceleration results of the X-axis direction outputted from the shock sensor 210, dotted lines 512, 516, 522, 526, 532, and 536 indicate acceleration results of the Y-axis direction outputted from the shock sensor 210, and dotted lines 513, 517, 523, 527, 533, and 537 indicate acceleration results of the Z-axis direction outputted from the shock sensor 210.

An optimized position of the shock sensor 210 may be determined based on whether the axis for the shock on the electronic device 101 matches the axis of the maximum shock detected by the shock sensor 210. Based on the results of the electronic device 101 falling on the X axis as shown in FIGS. 5A and 5B and the results of the electronic device 101 falling on the Z axis as shown in FIGS. 5E and 5F, if the shock sensor 210 is disposed at the upper left edge 411 and the center 419, the result values 511 and 515 of the X axis and the result values 533 and 537 of the Z axis have the greatest values and the falling on the X axis and the Z axis may be determined. By contrast, based on the results of the electronic device 101 falling on the Y axis as shown in FIGS. 5C and 5D, if the shock sensor 210 is disposed at the upper left edge 411, the result value 522 of the Y axis has the greatest value and the shock on the Y axis may be recognized. By contrast, if the shock sensor 210 is disposed at the center 419, the result value 527 of the Z axis has the greatest value and the shock on the Z axis, rather than the Y axis, may be recognized. Hence, accuracy of the shock recognition may be enhanced by mounting the shock sensor 210 at the edges 411 through 417, rather than the edge 419. In particular, if the shock sensor 210 is disposed at an edge, the electronic device 101 may fully recognize the shock even with a single shock sensor 210.

Figure 6:
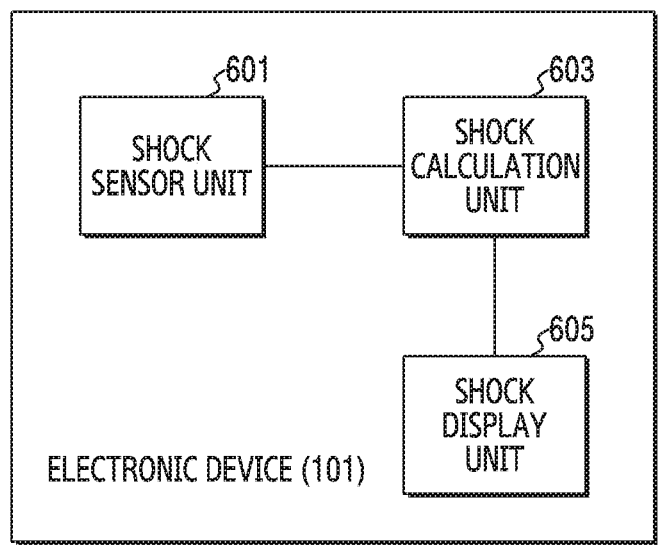
FIG. 6 illustrates a functional configuration of an electronic device for indicating impact of external shocks according to an embodiment of the disclosure.

FIG. 6 illustrates a functional configuration of an electronic device for indicating impact of external shocks according to an embodiment of the disclosure.

The configuration of FIG. 6 may be understood as a functional configuration of the electronic device 101, and only a part concerning the disclosure in the functional configuration of the electronic device 101 is illustrated. The configuration of FIG. 6 may be implemented by at least one of the blocks of the electronic device 101 of FIG. 1.

Referring to FIG. 6, the electronic device 101 may include a shock sensor unit 601, a shock calculation unit 603 and a shock display unit 605.

According to various embodiments, the shock sensor 601 may monitor acceleration information using the shock sensor 210 of FIG. 2, and provide the acceleration information to the shock calculation unit 603. The shock sensor 210 may be an accelerometer, a Low-g sensor for detecting a low-level shock, or a High-g sensor for detecting a high-level shock. In general, the electronic device 101, which may receive a high-level shock, may adopt the High-g sensor.

According to various embodiments, the acceleration information may be acceleration information of the X, Y, and Z axes of FIG. 4. Depending on a communication protocol or an information indication protocol between the shock sensor unit 601 and the shock calculation unit 603, the shock sensor unit 601 may provide the acceleration information as separate data per axis, or as one combined data for the three axes.

According to various embodiments, the shock sensor used at the shock sensor unit 601 provides the acceleration information for, but not limited to, the three axes of X, Y, and Z, but may provide acceleration information for one axis, two axes, or four or more axes.

According to various embodiments, the shock sensor unit 601 may monitor and provide the acceleration information to the shock calculation unit 603 at regular intervals. If the acceleration information is monitored at the regular intervals, continuous monitoring with low power may enable reduction of power consumption. Alternatively, the shock sensor unit 601 may not operate until a separate accelerometer detects a motion which is highly likely to cause a shock such as falling of the electronic device 101, and monitor and provide the acceleration information to the shock calculation unit 603 until the shock occurrence or at regular intervals for a specific time duration.

According to various embodiments, the shock calculation unit 603 may obtain shock related information based on the acceleration information per axis received from the shock sensor unit 601. The shock related information may include a shock amount and a shock direction. If receiving the combined data of the acceleration information of the three axes from the shock sensor unit 601, the shock calculation unit 603 may convert or extract acceleration information for each of the X, Y, and Z axes from the combined data. In the following, while it is assumed that the acceleration information is monitored for three axes of X, Y, and Z, it is apparent to those skilled in the art that similar results may be derived using a similar method with a different number of axes.

According to various embodiments, the shock calculation unit 603 may calculate the shock related information based on the acceleration information received from the shock sensor unit 601. According to an embodiment, the shock calculation unit 603 may calculate the shock amount based on the received acceleration per axis. The shock amount may be calculated as a vector sum of the accelerations per axis. According to an embodiment, the shock amount may be calculated based on Equation 1.

$$F=\sqrt{F_x^2+F_y^2+F_z^2} \qquad \text{Equation (1)}$$

In Equation 1, F denotes the shock amount, $F_x$ denotes the shock amount or the acceleration for the X axis, $F_y$ denotes the shock amount or the acceleration for the Y axis, and $F_z$ denotes the shock amount or the acceleration for the Z axis.

According to various embodiments, the shock calculation unit 603 may determine the shock direction by calculating an angle with each axis based on Equation (2).

$$A_x = \text{acos}\left(\frac{F_x}{F}\right) \times \frac{180}{\pi}$$
$$A_y = \text{acos}\left(\frac{F_y}{F}\right) \times \frac{180}{\pi} \qquad \text{Equation (2)}$$
$$A_z = \text{acos}\left(\frac{F_z}{F}\right) \times \frac{180}{\pi}$$

In Equation 2, $A_x$, $A_y$ and $A_z$ denote the angles between the shock direction and the X axis, the Y axis, and the Z axis respectively, F denotes the shock amount calculated in Equation 1, $F_x$ denotes the shock amount or the acceleration for the X axis, $F_y$ denotes the shock amount or the acceleration for the Y axis, $F_z$ denotes the shock amount or the acceleration for the Z axis, a cos denotes an inverse cosine or arc cosine function, and π denotes the ratio of a circle's circumference to its diameter (=3.14159).

The received acceleration information per axis may be stored in the memory 130, wherein all the received data may be stored or only acceleration information greater than a threshold may be stored. The shock related information may be calculated, acquired, and stored in the memory 130 only if the received acceleration information is greater than the threshold. According to an embodiment, the threshold may be a shock amount of the most shock-sensitive component among the components of the electronic device 101.

Figure 7:
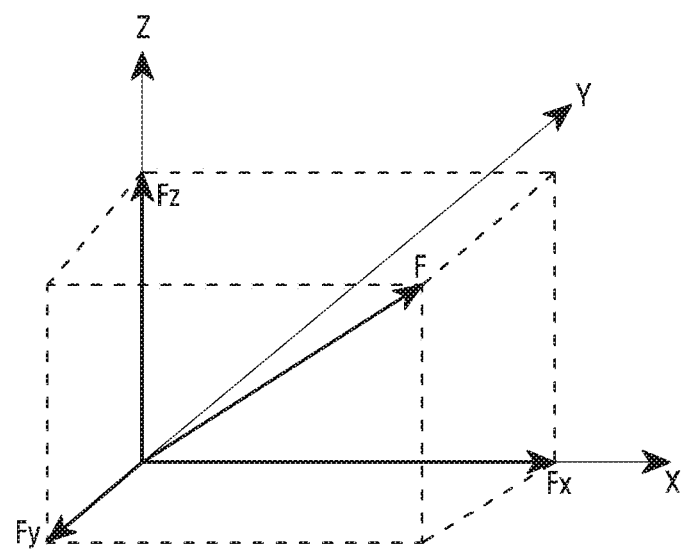
FIG. 7 illustrates calculation of a shock amount and a shock direction according to an embodiment of the disclosure.

FIG. 7 illustrates calculation of a shock amount and a shock direction according to an embodiment of the disclosure.

Referring to FIG. 7, the shock calculation unit 603 may calculate the shock amount for each axis based on the data received from the shock sensor unit 601, and acquire $F_x$600 G, $F_y$=−300 G, and $F_z$=400 G. The shock amount F may obtain the shock amount of about 781 G based on Equation 1. The shock calculation unit 603 may calculate the angle with each axis based on Equation 2. The shock direction calculated based on the above embodiment may be a vector direction with $A_x$=39.8 degrees, $A_y$=112.59 degrees, and $A_z$59.19 degrees. The shock calculation unit 603 may select a segment area including a housing portion of the electronic device 101 which is contacted in the shock direction, as a shocked segment area.

According to various embodiments, the shock calculation unit 603 may divide the housing of the electronic device 101 into a plurality of segment areas and calculate a shock state of each segment area. The segment areas each may include a part of the housing of the electronic device 101, and the segment areas may be predefined and stored in a storage device (e.g., the memory 130). The shock state may indicate shock information of the electronic device 101 in view of the user. A shock level detected by the shock sensor and an impact on the user or caused by the shock may vary in each situation, which may be variously defined according to a shape or a material of the component of the electronic device 101. The shock state may provide an instantaneous shock state alone or an accumulated shock state.

According to various embodiments, the segment areas may be defined variously according to a shape of the electronic device 101. According to an embodiment, the electronic device 101 of a cuboid-like shape and a circular electronic device 101 may have different shock positions when falling. If the electronic device 101 of the cuboid-like shape is shocked due to the fall, it may structurally contact the ground first with its edge. Secondary and tertiary shocks may differ in form according to a posture of the fall. By contrast, the circular electronic device 101 may always contact the ground with its center. Hence, the electronic device 101 of the cuboid-like shape may define eight shocked segment areas based on the edges, whereas the circular electronic device 101 may define the segment areas based on a center angle, rather than the edges, depending on the shock direction.

Figure 8:
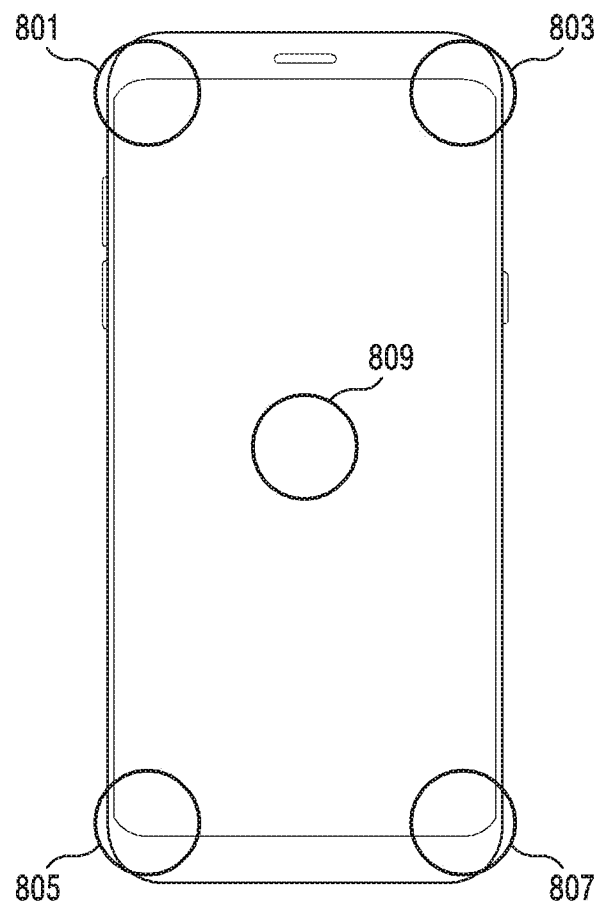
FIG. 8 illustrates segment areas defined in an electronic device of a cuboid-like shape according to an embodiment of the disclosure.

FIG. 8 illustrates segment areas defined in an electronic device of a cuboid-like shape according to an embodiment of the disclosure.

Referring to FIG. 8, a typical smartphone is in a cuboid-like shape and may be shocked mostly on its edges in a fall. Hence, the typical smartphone of the cuboid-like shape may be divided into 10 segment areas of front-up-left (FUL) 801, front-up-right (FUR) 803, front-bottom-left (FBL) 805, front-bottom-right (FBR) 807, back-up-left (BUP) (not shown), back-up-right (BUR) (not shown), back-bottom-left (BBL) (not shown), back-bottom-right (BBR) (not shown), front-middle (FM) 809 and back-middle (BM) (not shown).

Figure 9:
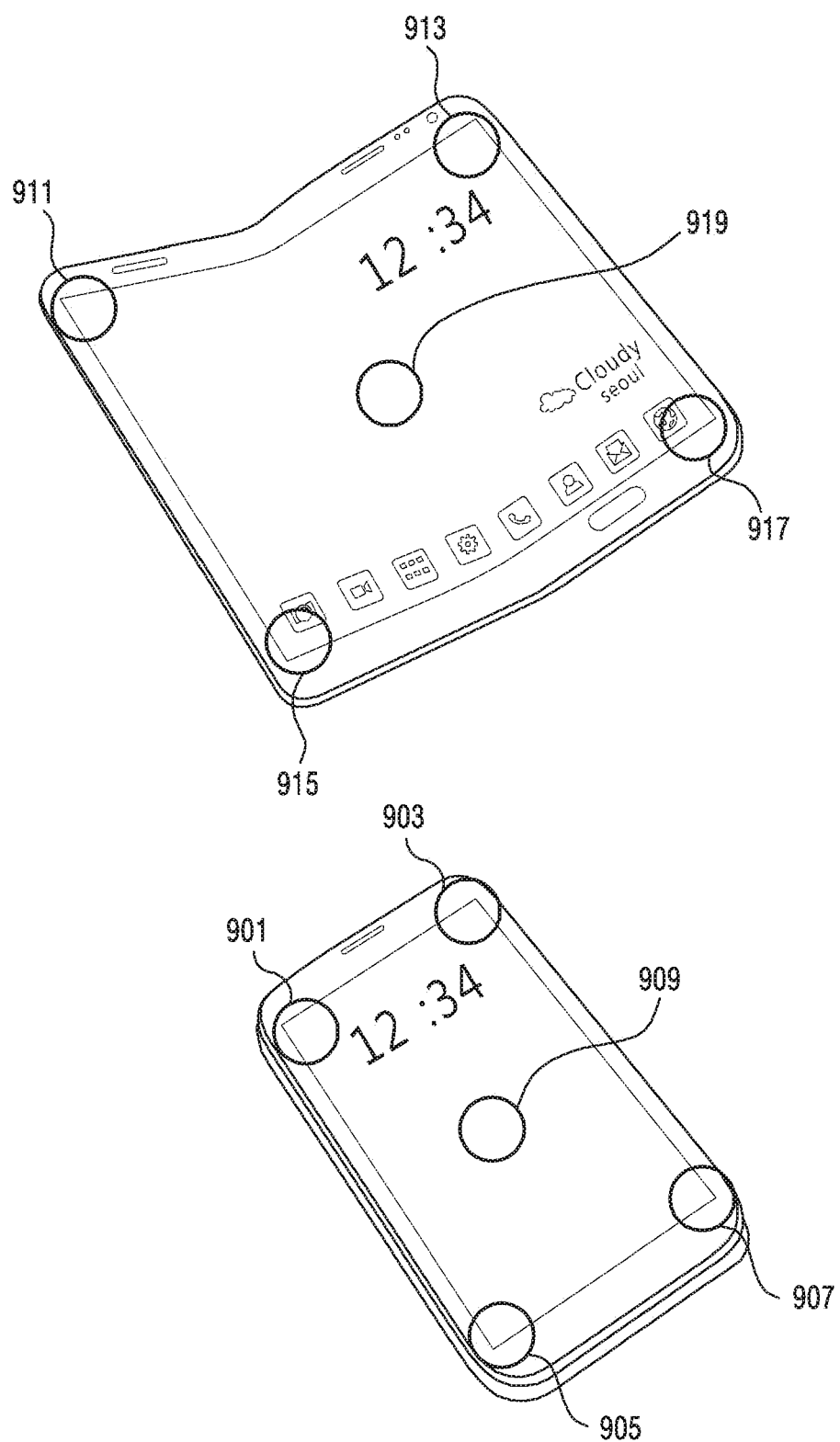
FIG. 9 illustrates segment areas defined according to an embodiment of the disclosure.

FIG. 9 illustrates segment areas defined according to an embodiment of the disclosure.

Referring to FIG. 9, if an electronic device (e.g., the electronic device 101 of FIG. 1) foldable on a hinge is folded and unfolded, not only the shape of the housing but also the shock position may change. While the folded electronic device is relatively robust to an external shock, the unfolded electronic device is more fragile due to the shock to the hinge portion and a display (e.g., the display device 160 of FIG. 1 or the display 401 of FIG. 4) may be damaged. Thus, the folding or the unfolding may change the state definition. That is, the foldable smartphone of the cuboid-like shape may define 10 segment areas of the folded state, including folded-front-up-left (FFUL) 901, folded-front-up-right FFUR) 903, folded-front-bottom-left (FFBL) 905, folded-front-bottom-right (FFBR) 907, folded-back-up-left (FBUP) (not shown), folded-back-up-right (FBUR) (not shown), folded-back-bottom-left (FBBL) (not shown), folded-back-bottom-right (FBBR) (not shown), folded-front-middle (FFM) 909 and folded-back-middle (FBM) (not shown), and may define 10 segment areas of the unfolded state, including unfolded-front-up-left (UFUL) 911, unfolded-front-up-right (UFUR) 913, unfolded-front-bottom-left (UFBL) 915, unfolded-front-bottom-right (UFBR) 917, unfolded-back-up-left (UBUP) (not shown), unfolded-back-up-right (UBUR) (not shown), unfolded-back-bottom-left (UBBL) (not shown), unfolded-back-bottom-right (UBBR) (not shown), unfolded-front-middle (UFM) 919 and unfolded-back-middle (UBM) (not shown).

According to various embodiments, the shock calculation unit 603 may select the segment area which is shocked, based on the calculated shock direction. Table 1 shows an embodiment for determining the shocked segment area based on the angle with each axis calculated based on Equation 2.

TABLE 1

| Az (degree) | Ay (degree) | Ax (degree) | Shocked segment area |
| --- | --- | --- | --- |
| ~00 | ~090 | ~90 | FM, FFM, UFM |
| ~180 | ~090 | ~90 | BM, FBM, UBM |
| 0~90 | 0~90 | 0~90 | FUR, FFUR, UFUR |

TABLE 1-continued

| Az (degree) | Ay (degree) | Ax (degree) | Shocked segment area |
| --- | --- | --- | --- |
| 0~90 | 0~90 | 90~180 | FUL, FFUL, UFUL |
| 0~90 | 90~180 | 0~90 | FBR, FFBR, UFBR |
| 0~90 | 90~180 | 90~180 | FBL, FFBL, UFBL |
| 90~180 | 0~90 | 0~90 | BUR, FBUR, UBUR |
| 90~180 | 0~90 | 90~180 | BUL, FBUL, UBUL |
| 90~180 | 90~180 | 0~90 | BBR, FBBR, UBBR |
| 90~180 | 90~180 | 90~180 | BBL, FBBL, UBBL |

In Table 1, '~degree', '~90 degrees', and '~180 degrees' may indicate values close to 0 degree, 90 degrees, and 180 degrees respectively. In an embodiment, '~0 degree' may range between 0 degree and 5 degrees, '~90 degrees' may range between 87 degrees and 93 degrees, and '~180 degrees' may range between 175 degrees and 180 degrees.

In Table 1, if Ax and Ay are close to 90 degrees and Az is close to 0 degree, the shocked segment area may be FM, FFM, or UFM. If both of Ay and Az are between 0 degree and 90 degrees, the shocked segment area may be FUR, FFUR or UFUR. If all of Ax, Ay and Az are between 90 degrees and 180 degrees, the shocked segment area may be BBL, FBBL or UBBL.

According to various embodiments, the shock calculation unit 603 may schematize an impact on a main component of the electronic device 101 based on the shock amount and the shocked segment area information. For the schematization, the shock calculation unit 603 may obtain information of the main component of the electronic device 101. In an embodiment, the shock calculation unit 603 may obtain the information such as a mounting position and a shock sensitivity of the main component. The main component information may be preset and stored in a storage device (e.g., the memory 130). The shock calculation unit 603 may determine the shocked main component, based on the shock amount, the shocked segment area, and the mounting position of the main component. In an embodiment, the shock calculation unit 603 may determine that the main component mounted in the shocked segment area is shocked. The shock calculation unit 603 may determine whether the main component is shocked, or a shock level, based on the calculated shock amount and the shock sensitivity of the corresponding main component. In an embodiment, since a lithium-ion battery is sensitive to an external shock, if detecting a considerable long-term shock, the electronic device may determine a serious shock to the battery.

According to various embodiments, the shock calculation unit 603 may calculate impacts of secondary and tertiary shocks as well as the primary shock. If the electronic device 101 falls to the ground, the electronic device 101 may suffer secondary and tertiary shocks, rather than a single shock. In an embodiment, if the electronic device 100 which is falling suffers a primary shock from a hand and suffers a secondary shock on the ground, the secondary shock amount may be greater than the primary shock amount. In another embodiment, the first shock may exhibit a considerable shock amount but may prevent the shock to the structure thanks to the edges, whereas the secondary shock may be exerted on a front side including the display 401 to damage the display 401. As such, the secondary and tertiary shocks may also impact on the electronic device 101, and accordingly the shock calculation unit 603 may calculate the secondary and tertiary shocks and determine the impact of those shocks.

According to various embodiments, only if one of the acceleration or the shock amount for each axis exceeds a specific value, the shock calculation unit 603 may recognize the shock and calculate the shock amount and the shock direction. According to an embodiment, only if at least one of the shock amounts for the axes exceeds 250 G, the shock calculation unit 603 may calculate or determine the shock amount, the shock direction, the shocked segment area, and the shock state on the main component by calculating the shock.

According to various embodiments, the shock display unit 605 may provide a user with the shock amount and shock area information, by displaying the shock amount, the shock direction, or the shocked segment area calculated at the shock calculation unit 603, on a display device (e.g., the display device 160 of FIG. 1) such as the display 401. In so doing, the shock amount and shock area information may be displayed as an image, a text, and so on. According to an embodiment, the results calculated at the shock calculation unit 603 may be displayed as a text on a screen, or an image indicating the shock may be displayed at a position closest to the determined shock area on the display 401. A size of the image may vary depending on the shock amount.

The shock display unit 605 may display the shock state of the main component.

Figure 10:
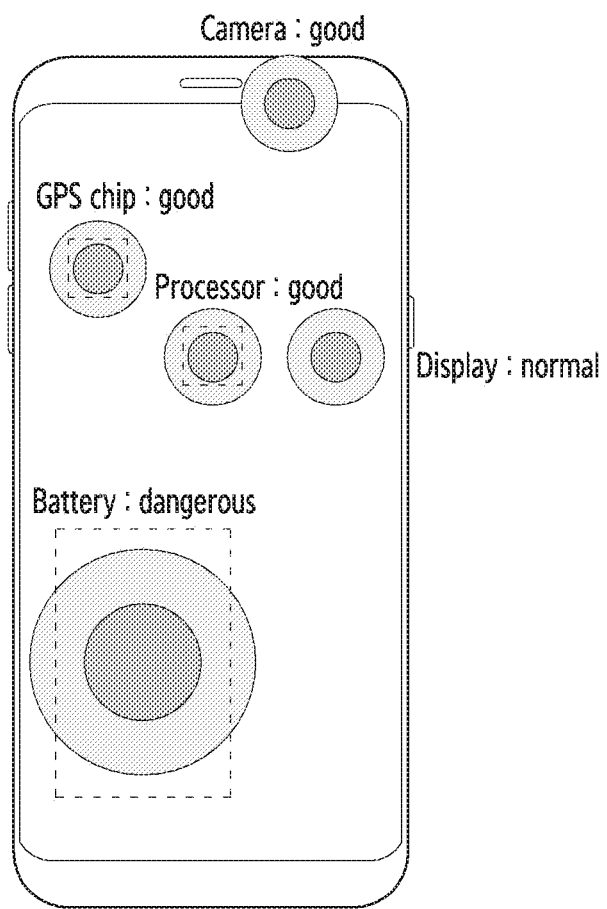
FIG. 10 illustrates shock states of main components indicated by a shock display unit on a display according to an embodiment of the disclosure.

FIG. 10 illustrates shock states of main components indicated by a shock display unit on a display according to an embodiment of the disclosure.

Referring to FIG. 10, the shock calculation unit 603 may determine the shock state of each main component as "good", "normal", or "dangerous", based on the accumulative shock amount and the shock sensitivity of each main component. The shock display unit 605 may indicate to the user a name and the shock state of each main component on the display which is close to an internal position of each main component, based on the results calculated at the shock calculation unit 603.

According to various embodiments, the shock display unit 605 may not only indicate the shock state of the main component but also guide the user to an inspection or a repair of the main component determined to be "dangerous". In addition, in the inspection or the repair, the shock display unit 605 may facilitate the repair by indicating the shock state of the main component to a service technician, and help the service technician to identify a problem of the electronic device 101.

The aforementioned shock calculation unit 603 and the shock display unit 605 may be implemented as software in the processor 120, may be implemented by a separate hardware device or other processor than the processor 120, or may be implemented by combining hardware and software.

According to various embodiments, an electronic device (e.g., the electronic device 101) may include a housing, a shock sensor disposed in the housing and configured to detect a shock, a processor disposed in the housing and operatively coupled with the shock sensor, and a memory disposed in the housing and operatively coupled with the processor, wherein the memory may be configured to store segment area information which segments the housing into a plurality of areas, and the memory may store instructions, when executed, for causing the processor to monitor acceleration information using the shock sensor, obtain shock related information based at least in part on the acceleration information, select one of the segment areas of the housing as a segment area which receives an external shock, based at least in part on the shock related information and the segment area information, and store the shock related information in the memory in association with the selected segment area.

According to various embodiments, the instructions may cause the processor to obtain the shock related information of a primary shock and at least one secondary chain shock, based at least in part on the acceleration information.

According to various embodiments, the shock related information may include a shock amount and a shock direction, and the instructions may cause the processor to calculate the shock amount and the shock direction, based at least in part on the acceleration information, and select one of the segment areas of the housing as a segment area which receives an external shock, based at least in part on the shock direction and the segment area information.

According to various embodiments, the acceleration information may include acceleration information of each of a plurality of axes, and the instructions may cause the processor to calculate the shock amount and the shock direction based on the acceleration information of the axes.

According to various embodiments, the instructions may cause the processor to, if the calculated shock amount exceeds a set threshold, determine a shock state in the housing, based at least in part on the selected segment area and the shock amount.

According to various embodiments, the shock state in the housing may include a shock state of a component mounted in the housing, and the instructions may cause the processor to, if the calculated shock amount exceeds the set threshold, determine the shock state of the component mounted in the housing, based at least in part on the selected segment area, the shock amount, a position of the mounted component, and shock sensitivity of the component.

According to various embodiments, the electronic device may further include a touchscreen display viewed through part of the housing, wherein the instructions may cause the processor to display information of the shock state in the housing or the shock state of the component mounted in the housing, on the touchscreen display.

According to various embodiments, the segment area information may include area information corresponding to each segment area, by segmenting the housing into a plurality of areas based on a shape of the housing and/or folding or unfolding of the housing.

According to various embodiments, the shock sensor may be configured to be disposed out of a center of the electronic device.

According to various embodiments, the electronic device may further include an accelerometer disposed in the housing and configured to measure an acceleration of a first range, wherein the shock sensor may be configured to measure an acceleration of a second range which is higher than the first range, and the instructions may cause the processor to, if the accelerometer detects a motion of the electronic device, monitor acceleration information using the shock sensor.

Now, operations of the electronic device 101 constructed as above are described.

Figure 11:
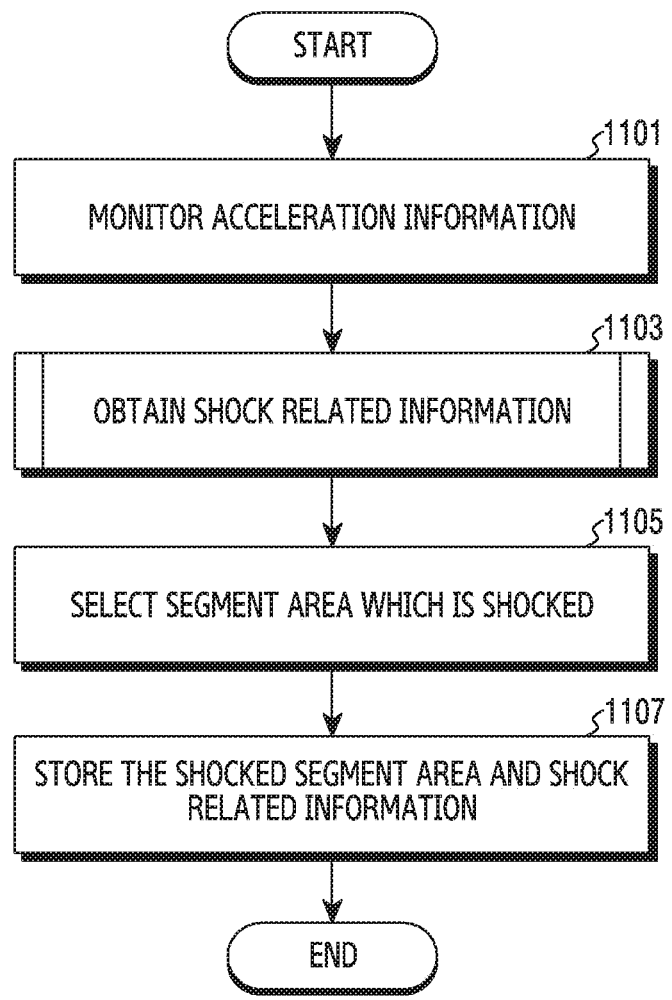
FIG. 11 illustrates operations of an electronic device for determining a shock area of a housing according to an embodiment of the disclosure.

FIG. 11 illustrates operations of an electronic device for determining a shock area of a housing according to an embodiment of the disclosure.

Referring to FIG. 11, an operating entity of the flowchart may be construed as the electronic device 101 or a component (e.g., the processor 120, the sensor module 176) of the electronic device 101.

According to various embodiments, the electronic device 101 (e.g., the sensor module 176) may monitor acceleration information using a shock sensor in operation 1101. The acceleration information may be acceleration information for each of the X, Y, and Z axes, and the electronic device 101 may monitor and generate the acceleration information at regular intervals. According to another embodiment, the electronic device 101 may detect a motion such as a fall, which is highly likely to cause a shock, using a separate accelerometer, and monitor and generate the acceleration information using the shock sensor at regular intervals for a specific time duration only if detecting the motion.

According to various embodiments, the electronic device 101 may obtain shock related information based on the acceleration information in operation 1103. The shock related information may include a shock amount and a shock direction. The shock amount may indicate a shock magnitude, and the shock direction may indicate a direction of the shock. The shock amount and the shock direction may be expressed as a vector and calculated as a vector sum of the accelerations of the axes (e.g., X, Y, and Z axes).

According to various embodiments, the electronic device 101 may select a segment area which is shocked in operation 1105. The housing of the electronic device 101 may be segmented into a plurality of areas, and each segmented area may be referred to as a segment area. The segment areas each may include a part of the housing of the electronic device 101, and the segment areas may be predefined and stored in a storage device (e.g., the memory 130).

In an embodiment, a smartphone is in a cuboid-like shape and is shocked mostly on its edges if it falls. Hence, for the smartphone of the cuboid-like shape, the electronic device 101 may define 10 segments areas of FUL, FUR, FBL, FBR, BUP, BUR, BBL, BBR, FM and BM as shown in FIG. 8. According to another embodiment, for a foldable smartphone, the electronic device 101 may define 20 segment areas of FFUL, FFUR, FFBL, FFBR, FBUP, FBUR, FBBL, FBBR, FFM, FBM, UFUL, UFUR, UFBL, UFBR, UBUP, UBUR, UBBL, UBBR, UFM and UBM as shown in FIG. 9. Alternatively, the electronic device 101 may define two-dimensional segment areas. According to an embodiment, instead of the 20 segment areas, the electronic device 101 may define 10 segments areas of {FUL, FUR, FBL, FBR, BUP, BUR, BBL, BBR, FM, BM} and two state information of {folded, unfolded}. According to an embodiment, {folded, FUL} may be defined as one segment area.

According to various embodiments, the electronic device 101 may select the shocked segment area, based on the shock direction obtained from the acceleration information as stated earlier. According to an embodiment, the electronic device 101 may select the segment area including part of the electronic device housing which contacts the shock direction, as the shocked segment area. The shocked segment area may be selected based on Table 1 using the angle with each axis calculated based on Equation 2.

According to various embodiments, the electronic device 101 may combine and store the shock related information including the shock amount and the selected shocked segment area in a storage device (e.g., the memory 130 of FIG. 1) in operation 1107. The stored information may be used to determine the shock state inside the housing, more specifically, the shock state of the component mounted in the housing.

According to various embodiments, the electronic device 101 may determine the shock state of the main component mounted in the housing based on the shocked segment area. According to an embodiment, the electronic device 101 may determine damage of the display if the shocked segment area is FUL of FIG. 8 and the shock magnitude is 250 G. According to another embodiment, the electronic device 101 may determine damage of a camera (e.g., the camera module 180 of FIG. 1) if the shocked segment area is FUR of FIG. 8 and the shock magnitude is 300 G. In so doing, the electronic device 101 may determine the shock state of the main component based on an instantaneous shock. The electronic device 101 may determine an accumulated shock state of the main component, from a plurality of shocks. According to an embodiment, if the shocked segment area is FUL or FUR of FIG. 8 and shocks over 200 G are received more than three times, the electronic device 101 may determine damage of a speaker (e.g., the sound output device 155 of FIG. 1).

According to various embodiments, the electronic device 101 may further consider the shock sensitivity of each main component, to determine the shock state. According to an embodiment, based on the shock sensitivity, the electronic device 101 may determine the shock to the camera 180 only if the shock exceeds 300 G, but may determine the shock to the speaker 155 if the shock exceeds 200 G.

The electronic device 101 may determine the shock state of each main component as "good", "normal", and "dangerous", and indicate the determined shock state per main component on the display.

While the shock state of the main component mounted inside the housing is determined, the shock state of a major position in the housing may be also determined based on the shocked segment area, the shock amount, and sensitivity of the major position according to various embodiments.

According to various embodiments, in operations 1103 and 1105, the electronic device 101 (e.g., the processor 120) calculates the shock amount and the shock direction and selects the shocked segment area with respect to every shock, which may be performed only on the recognized shock. According to an embodiment, the electronic device 101 may recognize a shock only if at least one of accelerations monitored on the axes exceeds a specific value. According to an embodiment, the electronic device 101 may recognize a shock only if at least one of accelerations monitored on the axes exceeds 200 G, calculate the shock amount and the shock direction by processing the shock, and determine the shocked area. In addition, to detect only an instantaneous shock falling to the ground, the electronic device 101 may detect no shock if a shock duration exceeds one second and may detect a shock if the shock duration falls below one second.

According to various embodiments, while the electronic device 101 may recognize only an initial shock as the shock, the electronic device 101 may recognize up to secondary and tertiary shocks as the shocks. In a real use environment, the primary shock may be the greatest in general. However, if a primary shock area is a durable area, that is, a low-sensitivity area, the secondary and tertiary shocks, which are slight, may exert serious impact on the electronic device 101. Thus, the electronic device 101 may recognize shocks if the secondary and tertiary shocks satisfy the aforementioned shock recognition condition, calculate separate shock amounts and shock directions, and select the shock areas.

According to various embodiments, an operating method of an electronic device 101 may include monitoring acceleration information using a shock sensor, obtaining shock related information based at least in part on the acceleration information, based at least in part on segment area information by segmenting a housing into a plurality of areas and the shock related information, selecting one of the segment areas of the housing as a segment area which receives an external shock, and storing the shock related information in a memory in association with the selected segment area.

According to various embodiments, obtaining the shock related information based at least in part on the acceleration information may include obtaining the shock related information of a primary shock and at least one secondary chain shock, based at least in part on the acceleration information.

According to various embodiments, the shock related information may include a shock amount and a shock direction, and selecting the segment area which receives the external shock may include calculating the shock amount and the shock direction, based at least in part on the acceleration information, and selecting one of the segment areas of the housing as the segment area which receives the external shock, based at least in part on the shock direction and the segment area information.

According to various embodiments, the acceleration information may include acceleration information of each of a plurality of axes, and calculating the shock amount and the shock direction may include calculating the shock amount and the shock direction based on the acceleration information of the axes.

According to various embodiments, the operating method may further include, if the calculated shock amount exceeds a set threshold, determining a shock state in the housing, based at least in part on the selected segment area and the shock amount.

According to various embodiments, the shock state in the housing may include a shock state of a component mounted in the housing, and determining the shock state in the housing may further include, if the calculated shock amount exceeds the set threshold, determining the shock state of the component mounted in the housing, based at least in part on the selected segment area, the shock amount, a position of the mounted component, and shock sensitivity of the component.

According to various embodiments, the operating method may further include displaying information of the shock state in the housing or the shock state of the component mounted in the housing, on a touchscreen display.

According to various embodiments, the segment area information may include area information corresponding to each segment area, by segmenting the housing into a plurality of areas based on a shape of the housing and/or folding or unfolding of the housing.

According to various embodiments, an operating method of an electronic device 101 may include monitoring shock related information due to an external force, calculating a shock amount and a shock position based on the shock related information, and calculating a shock state of a component in the electronic device based on the shock amount and the shock position.

According to various embodiments, the operating method of an electronic device 101 may further include indicating the shock state of the component in the electronic device.

According to various embodiments, the shock related information may include shock amount related information of a plurality of axes.

According to various embodiments, calculating the shock amount and the shock position may include recognizing a primary shock and at least one second chain shock based on the shock related information, and calculating shock amounts and shock positions with respect to the primary shock and the at least one second shock.

According to various embodiments, calculating the shock amount and the shock position may include calculating a total shock amount based on the shock related information, determining a shock direction by calculating angles with the axes based on the shock related information and the calculated total shock amount, and determining the shock position based on the shock direction.

According to various embodiments, calculating the shock amount and the shock position may further include recognizing shocks based on the shock related information.

According to various embodiments, determining the shock position based on the shock direction may include segmenting the electronic device into a plurality of segment areas, and determining one of the segment areas as the shock position based on the angles with the axes indicating the shock direction.

According to various embodiments, segmenting the electronic device into the segment areas may include segmenting the segment areas based on a shape of a housing of the electronic device and folding or unfolding.

According to various embodiments, calculating the shock state of the component in the electronic device may include calculating the shock state of the component in the electronic device further based on shock sensitivity of the component.

According to various embodiments, calculating the shock state of the component in the electronic device may include determining the shock state of the component as "good", "normal", and "dangerous", and indicating the shock state of the component in the electronic device may include indicating a name of the component and one of "good", "normal", and "dangerous" corresponding to the shock state of the component on a display close to a position of the mounted component.

The disclosure provides various embodiments for recognizing shocks in an electronic device and calculating impact of the shocks on a component of the electronic device.

At least one of various embodiments described in this disclosure may provide the user with significant shock information such as a shock magnitude, a shock point, a shock state of a main component.

Further, according to various embodiments of the disclosure, the user may receive recommendation for an accessory to protect a segment area which is shocked frequently, or receive services such as premium discount and damage cause prediction for repair.

A method and an electronic device according to various embodiments may recognize a shock amount and a shock position of an external shock, determine an external shock point, and indicate to the user a shock state of the electronic device due to the external shock, thus satisfying a user's curiosity and reducing repair time.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an ASIC.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing;
   a shock sensor disposed in the housing and configured to detect a shock;
   at least one processor disposed in the housing and operatively coupled with the shock sensor; and
   a memory disposed in the housing and operatively coupled with the at least one processor,
   wherein the memory is configured to store segment area information which segments the housing into a plurality of segment areas, and
   wherein the memory stores instructions which, when executed, cause the at least one processor to:
     monitor acceleration information using the shock sensor,
     obtain shock related information including a shock amount and a shock direction based at least in part on the acceleration information,
     select one of the segment areas of the housing as a segment area which receives an external shock based at least in part on the shock related information and the segment area information,
     identify a shock state of a component disposed in the selected segment area based at least in part on a shock sensitivity of the component, and
     provide information related to the identified shock state of the component.

2. The electronic device of claim 1, wherein the instructions further cause the at least one processor to obtain shock related information of a primary shock and at least one secondary chain shock based at least in part on the acceleration information.

3. The electronic device of claim 1,
   wherein the instructions further cause the at least one processor to:
     calculate the shock amount and the shock direction based at least in part on the acceleration information,
     select one of the segment areas of the housing as a segment area which receives an external shock based at least in part on the shock direction and the segment area information, and
     store the shock related information in the memory in association with the selected segment area.

4. The electronic device of claim 3,
   wherein the acceleration information comprises acceleration information of each of a plurality of axes, and
   wherein the instructions further cause the at least one processor to calculate the shock amount and the shock direction based on the acceleration information of the axes.

5. The electronic device of claim 3, wherein the instructions further cause the at least one processor to, if the calculated shock amount exceeds a set threshold, identify the shock state in the housing based at least in part on the selected segment area and the shock amount.

6. The electronic device of claim 5,
wherein the instructions further cause the at least one processor to, if the calculated shock amount exceeds the set threshold, identify the shock state of the component based at least in part on the selected segment area, the shock amount, a position of the component, or the shock sensitivity of the component.

7. The electronic device of claim 5, further comprising a touchscreen display viewed through part of the housing,
wherein the instructions further cause the at least one processor to display information of the shock state in the housing or the shock state of the component, on the touchscreen display.

8. The electronic device of claim 6, further comprising a touchscreen display viewed through part of the housing,
wherein the instructions further cause the at least one processor to display information of the shock state in the housing or the shock state of the component, on the touchscreen display.

9. The electronic device of claim 1, wherein the segment area information comprises area information corresponding to each segment area by segmenting the housing into the plurality of segment areas based on a shape of the housing or folding or unfolding of the housing.

10. The electronic device of claim 1, wherein the shock sensor is configured to be disposed out of a center of the electronic device.

11. The electronic device of claim 1, further comprising an accelerometer disposed in the housing and configured to measure an acceleration of a first range,
wherein the shock sensor is configured to measure an acceleration of a second range which is higher than the first range, and
wherein the instructions further cause the at least one processor to, if the accelerometer detects a motion of the electronic device, monitor acceleration information using the shock sensor.

12. An operating method of an electronic device, the operating method comprising:
monitoring acceleration information using a shock sensor;
obtaining shock related information including a shock amount and a shock direction based at least in part on the acceleration information;
selecting, based at least in part on segment area information by segmenting a housing into a plurality of segment areas and the shock related information, one of the segment areas of the housing as a segment area which receives an external shock;
identifying a shock state of a component disposed in the selected segment area based at least in part on a shock sensitivity of the component; and
providing information related to the identified shock state of the component.

13. The operating method of claim 12, wherein the obtaining of the shock related information based at least in part on the acceleration information comprises obtaining the shock related information of a primary shock and at least one secondary chain shock based at least in part on the acceleration information.

14. The operating method of claim 12,
wherein the selecting of the segment area which receives the external shock comprises:
calculating the shock amount and the shock direction based at least in part on the acceleration information;
selecting one of the segment areas of the housing as the segment area which receives the external shock based at least in part on the shock direction and the segment area information; and
storing the shock related information in a memory in association with the selected segment area.

15. The operating method of claim 14,
wherein the acceleration information comprises acceleration information of each of a plurality of axes, and
wherein the calculating of the shock amount and the shock direction comprises calculating the shock amount and the shock direction based on the acceleration information of the axes.

16. The operating method of claim 14, further comprising, if the calculated shock amount exceeds a set threshold, identifying the shock state in the housing based at least in part on the selected segment area and the shock amount.

17. The operating method of claim 16,
wherein the identifying of the shock state in the housing further comprises, if the calculated shock amount exceeds the set threshold, identifying the shock state of the component based at least in part on the selected segment area, the shock amount, a position of the component, or the shock sensitivity of the component.

18. The operating method of claim 16, further comprising displaying information of the shock state in the housing or the shock state of the component, on a touchscreen display.

19. The operating method of claim 17, further comprising displaying information of the shock state in the housing or the shock state of the component, on a touchscreen display.

20. The operating method of claim 12, wherein the segment area information comprises area information corresponding to each segment area by segmenting the housing into the plurality of segment areas based on a shape of the housing or folding or unfolding of the housing.

21. The electronic device of claim 6, wherein the shock state of the component is one of "good," "normal," or "dangerous".

22. The electronic device of claim 7, wherein the instructions further cause the at least one processor to display an image indicating the received external shock in a size varying depending on the shock amount and in a position closest to the selected segment area.

23. The electronic device of claim 6, wherein the shock sensitivity varies according to the component.

24. The electronic device of claim 1, wherein the detected shock is at least 200 G.

* * * * *